(12) United States Patent
Gundu et al.

(10) Patent No.: US 9,736,660 B2
(45) Date of Patent: Aug. 15, 2017

(54) REDUCING SIZE OF MESSAGES OVER THE CELLULAR CONTROL CHANNEL

(71) Applicant: SONIM TECHNOLOGIES, INC., San Mateo, CA (US)

(72) Inventors: Veerabhadra Gundu, Sunnyvale, CA (US); Jean Louis Andje-Ngbwa, Mountain View, CA (US)

(73) Assignee: SONIM TECHNOLOGIES, INC., San Mateo, CA (US)

( * ) Notice: Subject to any disclaimer, the term of this patent is extended or adjusted under 35 U.S.C. 154(b) by 0 days.

(21) Appl. No.: 15/260,006

(22) Filed: Sep. 8, 2016

(65) Prior Publication Data

US 2016/0381529 A1 Dec. 29, 2016

Related U.S. Application Data

(63) Continuation of application No. 11/127,912, filed on May 11, 2005, now Pat. No. 9,467,488.

(60) Provisional application No. 60/654,021, filed on Feb. 16, 2005.

(51) Int. Cl.
| | |
|---|---|
| *H04B 7/00* | (2006.01) |
| *H04W 4/10* | (2009.01) |
| *H04W 84/08* | (2009.01) |
| *H04L 29/06* | (2006.01) |
| *H04L 29/12* | (2006.01) |
| *H04W 76/00* | (2009.01) |

(52) U.S. Cl.
CPC .............. *H04W 4/10* (2013.01); *H04L 61/309* (2013.01); *H04L 65/1006* (2013.01); *H04L 65/1016* (2013.01); *H04L 65/4061* (2013.01); *H04W 76/005* (2013.01); *H04W 84/08* (2013.01)

(58) Field of Classification Search
USPC ......................................................... 455/518
See application file for complete search history.

(56) References Cited

U.S. PATENT DOCUMENTS

| | | | | |
|---|---|---|---|---|
| 2002/0077136 A1* | 6/2002 | Maggenti et al. | .. | H04L 63/0428 455/518 |
| 2004/0028080 A1* | 2/2004 | Samarasinghe et al. | .................. | H04L 65/1006 370/486 |
| 2007/0142073 A1* | 6/2007 | Idnani | ..................... | H04W 4/10 455/518 |

* cited by examiner

*Primary Examiner* — Ankur Jain
(74) *Attorney, Agent, or Firm* — Rahman LLC

(57) ABSTRACT

Methods and apparatus for initiating a PTT call from a caller client device to a recipient client device. The methods and apparatus register the caller client device with the PTT system, wherein caller data identifying the caller client device is transmitted to the PTT system; store the caller data; generate, at the caller client device, a channel request message that includes channel allocation data and call invite messaging information; transmit the channel request message to the PTT system; parse the call invite messaging information from the channel request message; generate a call invite message based upon the call invite messaging information and the stored caller data; and establish the PTT call between the caller client device and the recipient client device based upon the call invite message. Additionally, the call invite messaging information includes an identification number and not the URI of the recipient client device.

8 Claims, 9 Drawing Sheets

```
REGISTER sip:eritalk.com SIP/2.0
From: <sip:12345678910@eritalk.com>;tag=9549
To: <sip:12345678910@eritalk.com>
Max-Forwards: 70
Via: SIP/2.0/UDP 10.1.254.14:7001;branch=z9hG4bK954b
Route: <sip:10.0.0.1:6666;transport=udp;lr>
Call-ID: 9548@10.1.254.14
CSeq: 1 REGISTER
Contact: <sip:12345678910@10.1.254.14:7001>;+g.poc.talkburst=TRUE;q=0.8
Authorization: Digest username="12345678910@eritalk.com"
Expires: 3600
```

```
HTTP/1.1 200 OK
Content-Type:application/buddies+xml;charset=UTF-8
Content-Length:849
Date:Wed, 24 Nov 2004 22:11:28 GMT
Server:-
Last-Modified:Thu, 18 Nov 2004 03:02:33 PST
<?xml version="1.0" encoding="UTF-8"?>
<buddies type='user'>
<buddy id='1' uri='sip:12345678905@eritalk.com' displayname='User 5'/>
<buddy id='2' uri='sip:12345678906@eritalk.com' displayname='User 6'/>
<buddy id='3' uri='sip:12345678907@eritalk.com' displayname='User 7'/>
<buddy id='5' uri='sip:12345678908@eritalk.com' displayname='User 8'/>
<buddy id='6' uri='sip:12345678911@eritalk.com' displayname='User 11'/>
<buddy id='8' uri='sip:12345678914@eritalk.com' displayname='u14'/>
<buddy id='9' uri='sip:12345678915@eritalk.com' displayname='u15'/>
<buddy id='10' uri='sip:12345678922@eritalk.com' displayname='u22'/>
<buddy id='11' uri='sip:12345678942@eritalk.com' displayname='user42'/>
<buddy id='12' uri='sip:12345678943@eritalk.com' displayname='user43'/>
</buddies>
```

```
INVITE sip:ad-hoc@sonim.com SIP/2.0
From: <sip:12345678922@sonim.com>;tag=4001
To: <sip:ad-hoc@sonim.com>
Max-Forwards: 70
Via: SIP/2.0/UDP 10.1.254.14:7001;branch=z9hG4bK4002
Call-ID: 4000@10.1.254.14
CSeq: 1 INVITE                                              56
Route: <sip:10.0.0.1:6666;transport=udp;lr>
Accept-Contact: *;+g.poc.talkburst=TRUE;require;explicit
Session-Expires: 1800;refresher=uac
Supported: timer
Require: pref
User-Agent: PoC-ms/1.0 1.3.3.6
Allow:
REGISTER,INVITE,BYE,CANCEL,NOTIFY,ACK,SUBSCRIBE,PUBLISH,UPDATE
Contact: <sip:12345678922@192.168.253.56:7001>
Proxy-Authorization: Digest username="12345678922@sonim.com",
realm="ericsson.se", nonce="bc6685d4995af9f634bdd7c7db1a6dd7", uri="sip:ad-
hoc@sonim.com", qop=auth, nc=00000006, cnonce="0a4f113b",
response="3991fb33f29e3a6a40bbdfa4d433627b"
Content-Type: multipart/mixed;boundary=m
Content-Length: 415
--m
Content-Type: application/sdp
Content-Length: 229
v=0
o=12345678922 0 0 IN IP4 10.1.254.14
s=PoC-Call
c=IN IP4 10.1.254.14
t=0 0
m=audio 7002 RTP/AVP 97
a=rtpmap:97 AMR/8000/1
a=fmtp:97 mode-set=0; octet-align=1
a=ptime:160
a=maxptime:400
a=+g.poc.talkburst
--m
Content-Type: application/vnd.poc.refer-to
Content-Length: 51
Refer-To: sip:12345678908@eritalk.com
--m--
```

Fig. 8

(Prior Art)

REDUCING SIZE OF MESSAGES OVER THE CELLULAR CONTROL CHANNEL

RELATED APPLICATIONS

This application is a continuation of U.S. Ser. No. 11/127,912 filed on May 11, 2005, which claims priority to U.S. Provisional Application Ser. No. 60/654,021 filed on Feb. 16, 2005, the complete disclosures of which, in their entireties, are herein incorporated by reference.

FIELD

The present invention relates in general to cellular communication technologies and in particular to a method of controlling data packet size during use of packet-based cellular applications.

BACKGROUND

Mobile cellular communication is evolving beyond traditional voice telephony towards more sophisticated services, such as Push-To-Talk (PTT). Similar to conventional walkie-talkie communication, PIT is a type of Voice Over IP (VOIP) communication that enables mobile communication users to send a voice message to one or more recipients over a mobile phone by simply pushing a key (i.e., PTT button, etc.).

One particular version of PTT, called PoC (PIT-over-Cellular), has started to be implemented in wireless data networks such as GSM/GPRS and CDMA cellular networks. By using internet protocols (i.e., an internet protocol network), these networks can provide a packet-based data service that enables information to be sent and received across a mobile telephone network. In addition, the use of internet protocols also facilitates PoC through the use of instant connections. That is, information can be sent or received immediately as the need arises, subject to available time slots at the air interface.

Since bandwidth over wireless data networks is at a premium and call session set-up time and voice quality are the primary concern of users, the proper management of data packets traveling over the network is extremely important. When PTT sessions are established, the time period between the initiation of the call and the ability of the caller to send a voice burst is known as "push-to-tone." This time period is measurable and standards have been established to provide carriers with a grading system with which to judge this measurement. The smaller this "push-to-tone" time period is, the better the user experience.

PoC is discussed in greater detail in the following technical specifications which are incorporated by reference: Push-to-talk over Cellular (PoC), Architecture, PoC Release 2.0, V2.0.8 (2004-06); Push-to-talk over Cellular (PoC), Signaling Flows—UE to Network Interface (UNI), PoC Release 2.0, V2.0.6 (2004-06); Push-to-talk over Cellular (PoC) User Plane, Transport Protocols, PoC Release 2.0, V2.0.8 (2004-06).

Of note, Release 1.0 is also available from the PoC Consortium as well as an upcoming PoC standard from Open Mobile Alliance (OMA). All of these are generally considered native PoC standards. Subsequently, a UE (user equipment), such as a PoC enabled cellular phone, supporting either of these standards is called a native PoC client.

Additional information is found in IETF RFC 3261, which is incorporated herein by reference. This document describes Session Initiation Protocol (SIP), which is an application-layer control (signaling) protocol for creating, modifying, and terminating sessions with one or more participants. These sessions include Internet telephone calls, multimedia distribution, and multimedia conferences.

Additional information is found in IETF RFC 3344, which is incorporated herein by reference. This document describes the method in Mobile IP by which a mobile node determines whether it is currently connected to its home network or to a foreign network, and by which a mobile node can detect when it has moved from one network to another.

SUMMARY

On aspect of the present invention provides a method of modifying signaling message data packets in such a way as to reduce their size and impact on the system. In particular, data packet load over the network is manipulated in such a way as to reduce the latency of call set-up (i.e., reduce the "push-to-tone" time) to acceptable levels according to established standards. By altering the SIP signaling messages sent during call session set-up to reduce packet size and utilize information already stored throughout the PoC system, the system can initiate call sessions within acceptable time periods and maximize user experience.

Another aspect of the present invention provides a method for further modifying signaling message data packets in such a way as to reduce their size and impact on the system by indexing the Universal Resource Locator (URI) in the contact lists used by the PoC system. The PoC application utilizes abbreviated addressing rather than using the URI written out in textual format. In other words, the index is used to map an integer to the textual representation. The textual representation exists on both sides of the network; the system only needs to send the integer across.

In one embodiment, the above aspects of the present invention are carried out by methods and apparatus for initiating a PTT call from a caller client device to a recipient client device. The methods and apparatus register the caller client device with the PTT system, wherein caller data identifying the caller client device is transmitted to the PTT system; store the caller data; generate, at the caller client device, a channel request message comprising channel allocation data and call invite messaging information; transmit the channel request message to the PTT system; parse the call invite messaging information from the channel request message; generate a call invite message based upon the call invite messaging information and the stored caller data; and establish the PTT call between the caller client device and the recipient client device based upon the call invite message. Additionally, the call invite messaging information includes an identification number and not the URI of the recipient client device.

DESCRIPTION OF THE DRAWINGS

The foregoing and other features, aspects, and advantages will become more apparent from the following detailed description when read in conjunction with the following drawings, wherein:

FIG. 3 is a representation of a sample SIP registration message sent from the UE to the PoC Server to register a user with the PoC application.

FIG. 4 is a diagram of a sample SIP contact list message in accordance with the preferred embodiment of the invention sent from the PoC Server to the UE containing the user's Contact List.

FIG. 8 is a diagram of a standard SIP Invite message that would be sent by the UE to begin a PTT call session.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to a PoC system, while other types of mobile radio networks can benefit form the present invention. Likewise, reference is made to PTT calls, while the present invention can be applied to other types of VOIP calls.

A. Overview

PoC may be implemented over a variety of access networks, including GPRS according to 3GPP Release 97/98, EGPRS according to 3GPP Release 99 or later releases, UMTS according to Release 99 or later releases, CDMA, and OFDM. For exemplary purposes, the preferred embodiment is described in the context of Mobile IP, which is utilized by CDMA and OFDM. The preferred embodiment is applied to the call session process at the originating handset, the call session process at the terminating handset, and the associated acknowledgement messages.

Figure 1:
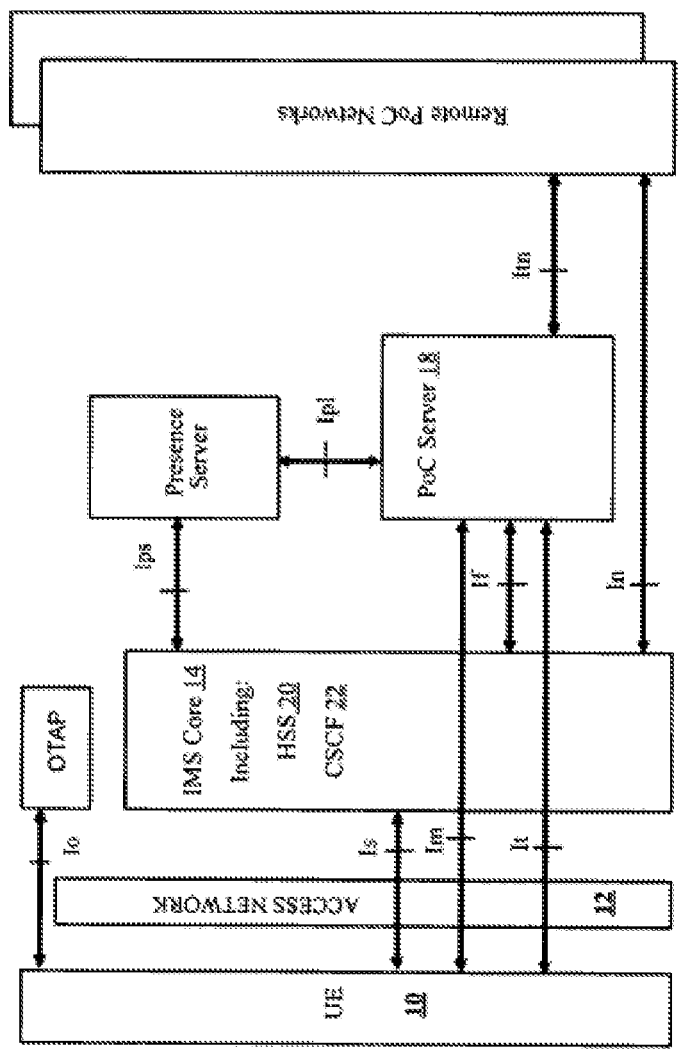
FIG. 1 is a block diagram of an exemplary PoC system architecture according to PoC Consortium specifications.

FIG. 1 diagrams an exemplary PoC system. This example follows the PoC Consortium specifications, but other configurations are possible. The preferred embodiment complies with the PoC Consortium specifications.

FIG. 1 shows the relationship between the various PoC system elements. The preferred embodiment addresses messaging activities between the UE 10 and the various elements that in part logically act as the PTT system 8 (the Access Network 12, the SIP/IP Internet Multimedia Subsystem (IMS) Core 14, and the PoC Server 18). In the preferred embodiment, the PoC GM (Group Management) is shown as part of the PoC Server for the sake of simplicity.

Figure 2:
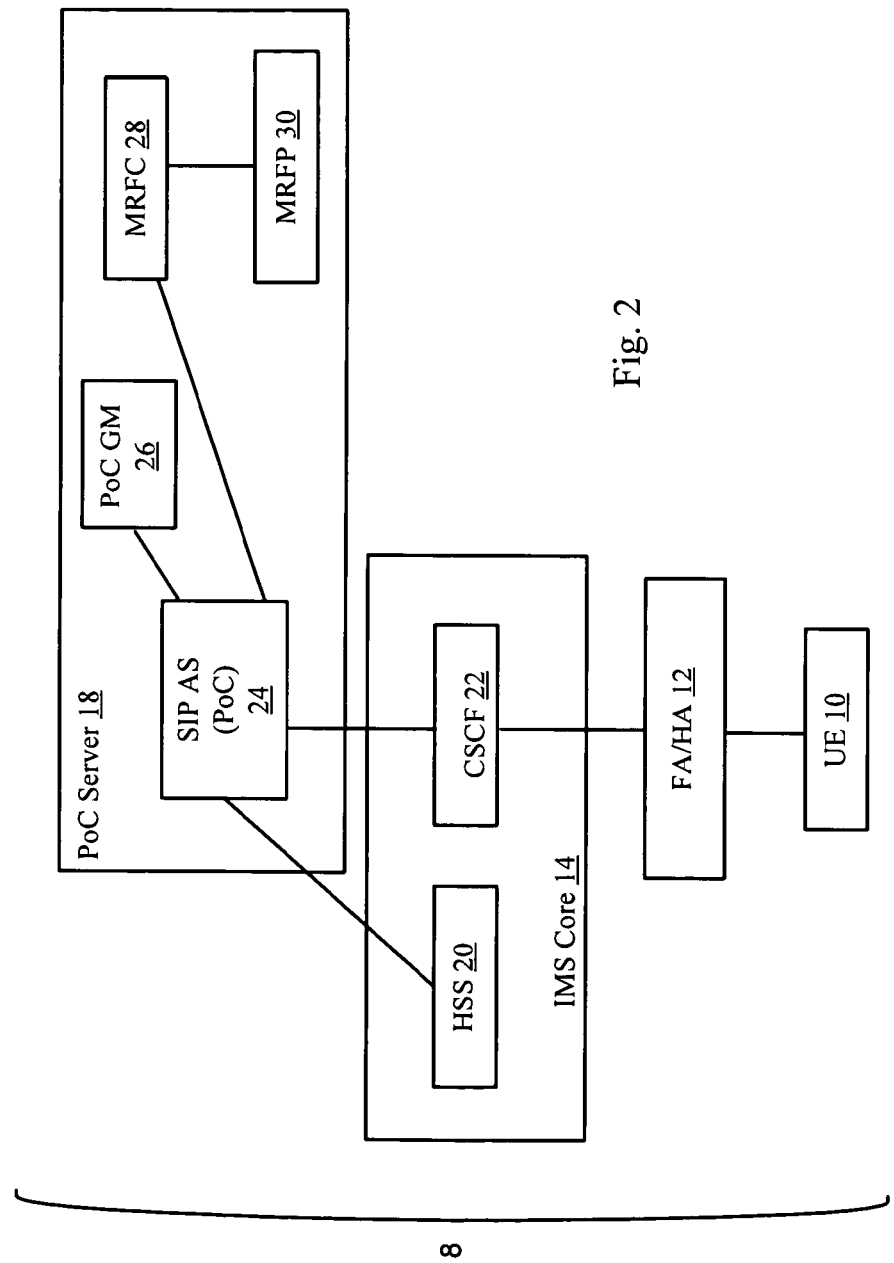
FIG. 2 is a block diagram of the various server entities in the PoC system of the preferred embodiment of the invention.

FIG. 2 shows the components of the IMS Core 14 and PoC Server 18 that interact with the UE 10 across the mobile IP network 12 (a network of Home Agents (HA) and Foreign Agents (FA)) to perform the method described herein. The IMS Core 14 is a server engine that controls call sessions over IP networks, and includes a Home Subscriber Server (HSS) 20 and a Call Session Control Function (CSCF) 22. The HSS 20 is a master database for the carrier's cellular network, which holds variables and identities for the support, establishment, and maintenance of calls and sessions made by subscribers. The CSCF 22 regulates the call session by sending and receiving SIP messages to and from the PoC Server 18. The UE 10 accesses the IMS Core 14 for purposes of SIP signaling to the PoC Server 18.

The CSCF 22 and the PoC Server 18 interact by way of SIP messages to create PTT sessions. The CSCF 22 forwards SIP messages received from the UE 10. The PoC Server 18 includes a SIP Application server (SIP AS) 24, a PoC Group Manager (PoC GM) 26, a Media Resource Function Controller (MRFC) 28 and a Media Resource Function Processor (MRFP) 30. The SIP AS 24 manages SIP messaging for PoC Server 18. The PoC GM 26 provides a centralized contact list (i.e., address book). The Media Resource Function elements (MRFC 28 and MRFP 30) control and process the media streams being transmitted during a call session.

The preferred embodiment concerns the messages that travel from the UE 10 to the CSCF 22 to the PoC Server 18 when the user registers with the PTT Service and initiates a PTT call. When the user turns on UE 10, a Registration message passes from the UE 10 to CSCF 22 in the IMS Core 14 to register the user with the PTT service.

When a user registers with the PTT service, a SIP registration message 32 containing the user's information is sent to CSCF 22. The CSCF 22 registers the user with the PTT service and stores some of the user information from the message in its local database for future use. This user information includes authentication, user agent capabilities, and various IDs. FIG. 3 is a sample registration message 32 sent from the UE 10 to the CSCF 22.

This registration message 32 contains information that will be stored in the CSCF 22 for future use during call session set-up. Table 1 lists the specific data fields found in the sample registration message 32 that are stored in the CSCF 22.

TABLE 1

Registration Message Fields Stored in CSCF

| Field | Use |
| --- | --- |
| Via | Used to record the Client IP/Port. Will also be the Top Via for reconstructed INVITE |
| Route | Will be the Route header for reconstructed INVITE |
| Contact | '+g.poc.talkburst' Parameter indicates a POC user. |

B. Contact List Indexing

Once the UE 10 has registered with the CSCF 22 and the data has been stored in the CSCF 22 database, the UE 10 sends a message to the PoC Server 18 to request a Contact List 34. A Contact List 34 typically contains the identifiers of other users or groups, which the user selects to initiate a PTT call with the chosen list member. An entry in Contact List 34 is a contact, e.g., the identity of a user or a group which is representative of multiple users. Within PoC systems, a Contact List 34 contains either users or groups, but not both. Generally, a contact is uniquely identified via a SIP URI (Session Initiation Protocol Universal Resource Identifier).

The PTT operator (e.g., Cingular, AWS, etc.) generally assigns to each user an address-of-record (also known as public user identity) in the form of a SIP URI comprising a user name portion and a domain portion. In general, the username portion of the SIP URI uniquely identifies the user within a given namespace or network. Likewise, the domain part of the SIP URI uniquely identifies a domain owned by the operator. For example, "sip:joe.doe@operator.net" in which "joe.doe" is the username portion of the SIP URI and "operator.net" is the domain portion of the SIP URI. Additional information may also be associated with a contact to facilitate interaction with the Contact List 34, for example, a display name.

In accordance with the preferred embodiment, an identifying number 36 is associated with each list entry in the Contact List 34 such that an index is created and stored in the PoC Server 18 when the UE 10 requests the Contact List 34 be sent down from the PoC Server 18 subsequent to SIP registration. This index will be used in the future during the call session set-up process. The PoC Server 18 then sends a message back down to the UE 10 containing the Contact List 34 with the corresponding index numbers 36, as shown in FIG. 4. The newly added 'id' attribute is in the form of "id='#'".

The SIP URI's are stored both on the UE 10 and in the PoC Server 18. By indexing between the PoC Server 18 and the UE 10, the PoC application utilizes abbreviated addressing rather than the Tel-SIP URI written out in textual format. In other words, the index is used to map an integer to the textual representation. The textual representation exists on both sides of the network; the system only needs to send the integer across. This creates SIP messages that are significantly smaller than regular SIP messages, resulting in faster transmission over the system and reduced latency in call set-up.

C. Binary Sip Invite

The preferred embodiment provides a further mechanism reducing call set-up time when the HT session is established over the cellular control channel.

During the standard set-up procedure for a PTT session, a channel request message is sent from the UE 10 to the Foreign Agent (FA) 38 and Home Agent (HA) 40 requesting a channel be opened for the upcoming session. HA 40 and FA 38 are part of the core network functions of the example embodiment cdma radio network and are utilized whenever sending traffic across the radio network irrespective of the destination. The primary responsibility of an FA 38 is to act as a tunnel agent, which establishes a tunnel to a HA 40 on behalf of a Mobile Node in Mobile IP, i.e., UE 10. HA 40 is a router on the home link that maintains registrations of mobile nodes that are away from home and their current addresses. The primary responsibility of the HA 40 is to act as a tunnel agent which terminates the Mobile IP tunnel, and which encapsulates datagrams to be sent to UE 10. Following this message exchange, the UE 10 sends out the official SIP Invite to the PoC Server 18 for the PTT call.

Figure 5:
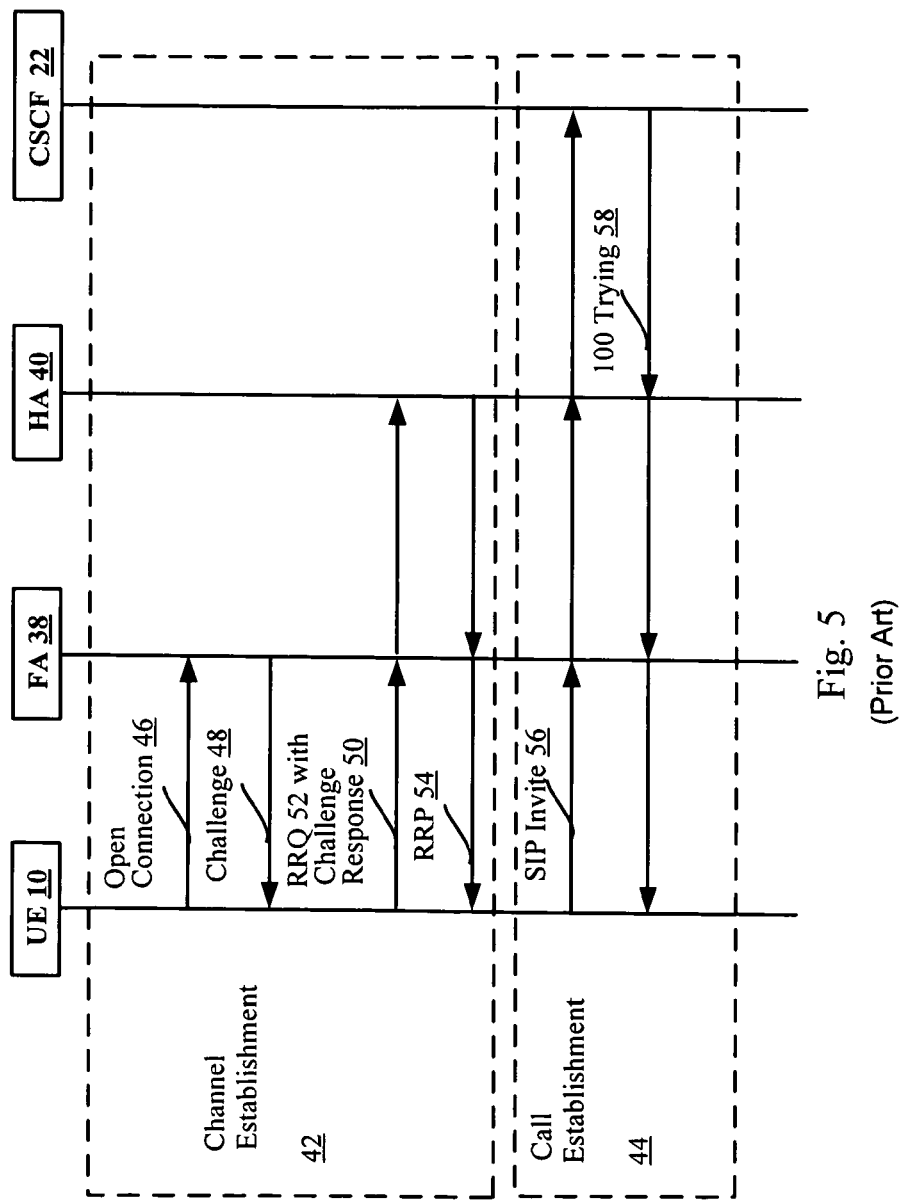
FIG. 5 is a data flow diagram depicting standard message flow during the channel request and SIP Invite segments of the PTT call set-up process.

The standard message flow, including the channel request and SIP Invite, during the PTT call set-up process is depicted in FIG. 5. The messages are divided into two sections: channel establishment 42 and call establishment 44. The channel request occurs in the channel establishment section 42 of the message stream, while the SIP Invite is part of the call establishment section 44.

As shown in FIG. 5, during channel establishment 42, an Open Connection message 46 is sent from UE 10 to the FA 38 and the FA 38 responds with a Challenge message 48. This directs UE 10 to resend the request with the inclusion of security data. As a result, UE 10 transmits a Registration Request (RRQ) message 52 (the channel request in SIP) with a challenge response message 50 embedded therein to the FA 38. The FA 38 passes pertinent data, RRQ 52, on to the HA 40 and then the HA 40 grants the channel request and responds with the Registration Response (RRP) message 54 which the FA 38 forwards back to the UE 10.

Once the channel is established, then the messages for call establishment 44 are sent. During call establishment 44, a SIP Invite message 56 is sent from UE 10 to CSCF 22 via FA 38 and HA 40. In response, CSCF 22 sends a 100 Trying message 58 back to UE 10.

FIG. 5 depicts the message flow as it is traditionally implemented. In poor radio conditions or high traffic networks, this message flow can result in high call latency. The channel has to be established before the SIP Invite message 56 is sent, which can take considerable time depending on network conditions. The messages of the Call Establishment 44 are a relatively small segment of the overall message stream that travels through the various system elements and out to the receiving UE 10 to establish a PTT session. While the use of contact list indexing, as previously described herein, will reduce the size of the SIP Invite messages for call establishment 44, the preferred embodiment provides further steps to reduce PTT call setup time by modifying the standard message flow from that shown in FIG. 5.

In accordance with the preferred embodiment, an enhanced RRQ message 60 is utilized that is formed by incorporating messaging information, which is traditionally is part of the standard SIP Invite message 56, into the standard RRQ message 52 so that call session set-up happens in a shorter time span. Also, by utilizing binary formatted SIP messaging information in the enhanced RRQ message 60, call session set-up time will be even shorter as the packets will be markedly smaller than regular SIP packets. The process of inserting binary SIP messaging information into the RRQ message 60 also involves the creation of a new message, binary SIP Invite message 62, which travels from the FA/HA 38/40 to the CSCF 22. The FA/HA 38/40 receives the channel request and forwards binary SIP Invite message 62, which comprises the binary SIP portion of the enhance RRQ message 60, to the CSCF 22 to be processed during the channel establishment 42 of the PTT call session set-up rather than during call establishment 44.

Figure 6:
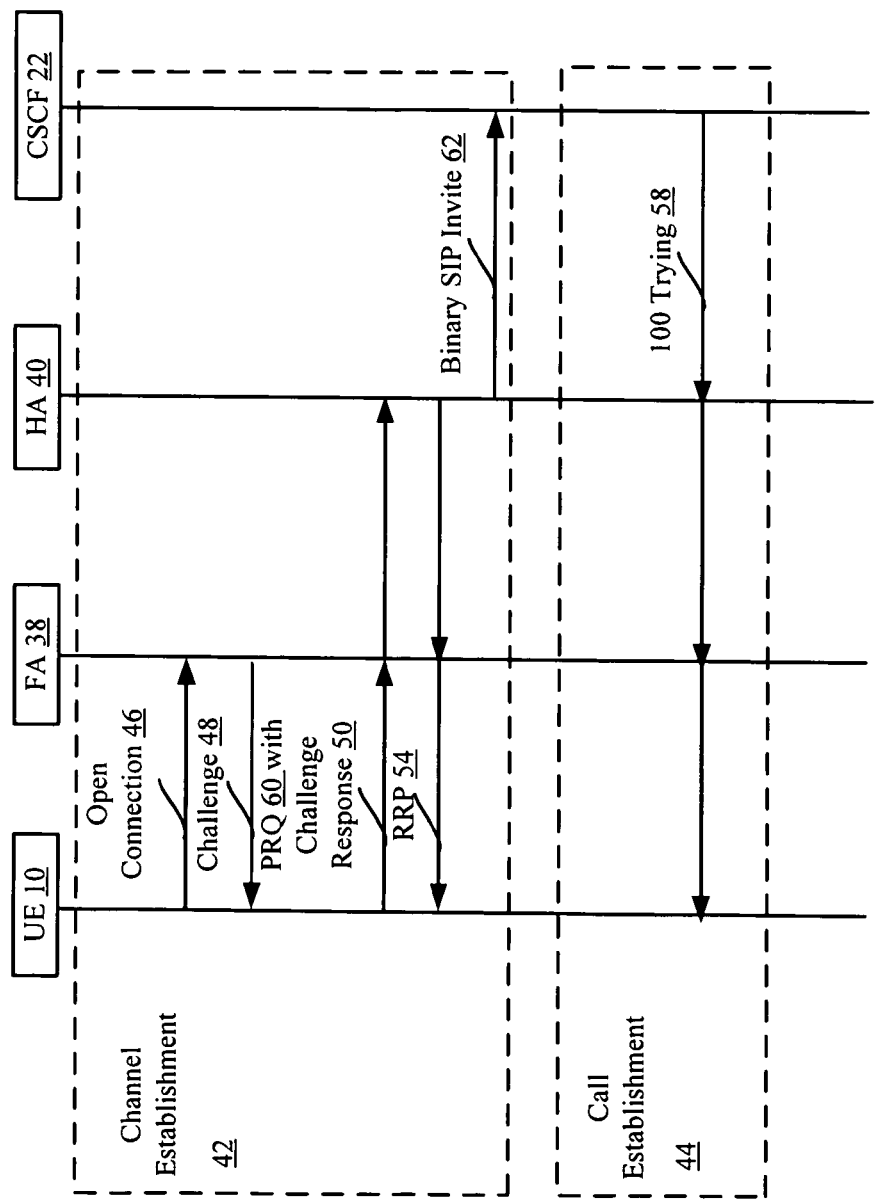
FIG. 6 is a data flow diagram depicting message flow in accordance with the preferred embodiment of the invention during the channel request.

FIG. 6 depicts the preferred embodiment, in which the binary SIP messaging information is parsed from the enhanced RRQ message 60 and sent from the HA 40 to the CSCF 22 in lieu of the standard SIP Invite message 56. This improved message flow shows the binary SIP message 60 traveling from the HA 38 to the CSCF 22 at the end of the channel establishment section 42 of the PTT call setup process. The SIP messaging information which forms binary SIP Invite message 60 is encapsulated within the enhanced RRQ message 60 that travels from the UE 10 to the HA 40 when the channel was requested.

Table 2 shows the fields typically found in the standard SIP Invite message 56 and whether or not they are required in the binary SIP Invite message 62. List items 16-23 are new elements that are part of the binary SIP Invite message 62 but not part of the standard SIP Invite message 56. These fields are added to the SIP message information from the binary SIP Invite 62 by the CSCF 22 and mapped to their regular SIP Invite attribute types so that CSCF 22 sends a standard SIP Invite message 56 to the PoC Server 18. Other fields are already stored in the CSCF 22 at the time CSCF 22 receives the binary SIP Invite message 62 and are not present in the binary SIP Invite message 62. They were either received by the CSCF 22 at registration time in the registration message 32 or are hard-coded in the CSCF 22. Table 2 also shows the proposed size of each field contained in the binary SIP message 62 as sent by the originating UE 10 when only the required fields are used in the message.

TABLE 2

SIP Message Fields from Originating Handset

| No. | Field | Parameters | Stored in | Rq'd in Binary SIP | Rq'd in regular SIP | Size (Bits) |
|---|---|---|---|---|---|---|
| 1 | Request URI | Ad hoc Group Request Parameter | PoC/binary encoding | Y | Y | 8 |
| 2 | Accept-Contact | Feature tag *;+g.poc.talkburst="TRUE";require;explicit | CSCF | N | Y | — |
| 3 | Require | Pref | CSCF | N | Y | — |
| 4 | Supported | Timer (UE responsible to refresh) | CSCF | N | Y | — |
| 5 | User Agent | Version handling, e.g., PoC-ms/2.0 | CSCF | N | Y | — |
| 6 | To | Ad-hocGroupRequest (sip:ad-hoc@myoperator.com) | PoC/binary encoding | N | Y | — |
| 7 | From | Public User Identity | CSCF | N | Y | — |
| 8 | Via | Shall include the comp=sigcomp parameter | CSCF | N | Y | — |
| 9 | Route | The configured SipPreRouteSet | CSCF | N | Y | — |
| 10 | Session-Expires | Shall include 'A refresh value' and refresher=uac | CSCF | N | Y | — |
| 11 | Proxy-Authorization | Digest username='Private User Identity', realm='operator domain name', nonce='Server specific challenge', qop='qop selected', uri='request-uri in this message', response='MD5 check sum', opaque='a IMS Core specific string', cnonce='a UE specific string', nc='previous nonce+1' | Not needed | N | Y | — |
| 12 | Contact | Shall include 1) comp=sigcomp. 2) feature tag +g.poc.talkburst | Not needed | N | Y | — |
| 13 | Allow | List of supported SIP methods (SIP UPDATE) | Not needed | N | Y | — |
| 14 | Content-Type | Multipart/mixed | Not needed |  | Y | — |
| 15 | Content-Type | Application/SDP. Indicates IPv4, voice codec reference and values of mode-set, ptime, octet-align, and maxptime. | Hard-coded SDP in CSCF | N | Y | — |
| 16 | ptime | Number of voice frames to be included in each RTP packet | Stays in client/CSCF | Y | Y | 3 |
| 17 | Codec type | Full rate G.279 or half rate G.729 | Stays in client/CSCF | Y | Y | 2 |
| 18 | To List | List of terminating users: Public User Identity or phone number | PoC/binary encoding | Y | Y | 96 |
| 19 | Sub ID | ID of the subscriber communicating with the CSCF | Stays in client/CSCF | Y | N | 32 |
| 20 | Correlation ID | Identifies the mapping between the public ID and private ID | Stays in client/CSCF | Y | N | 2 |
| 21 | Session ID | To maintain the Invite session ID | Stays in client/CSCF | Y | N | 2 |
| 22 | Call Type | Identifies if it is a group call, ad hoc call or jumpstart call | Stays in client/CSCF | Y | N | 2 |
| 23 | Header | Message header between client and CSCF | Stays in client/CSCF | Y | N | 16 |

D. RRQ Format

Figure 7:
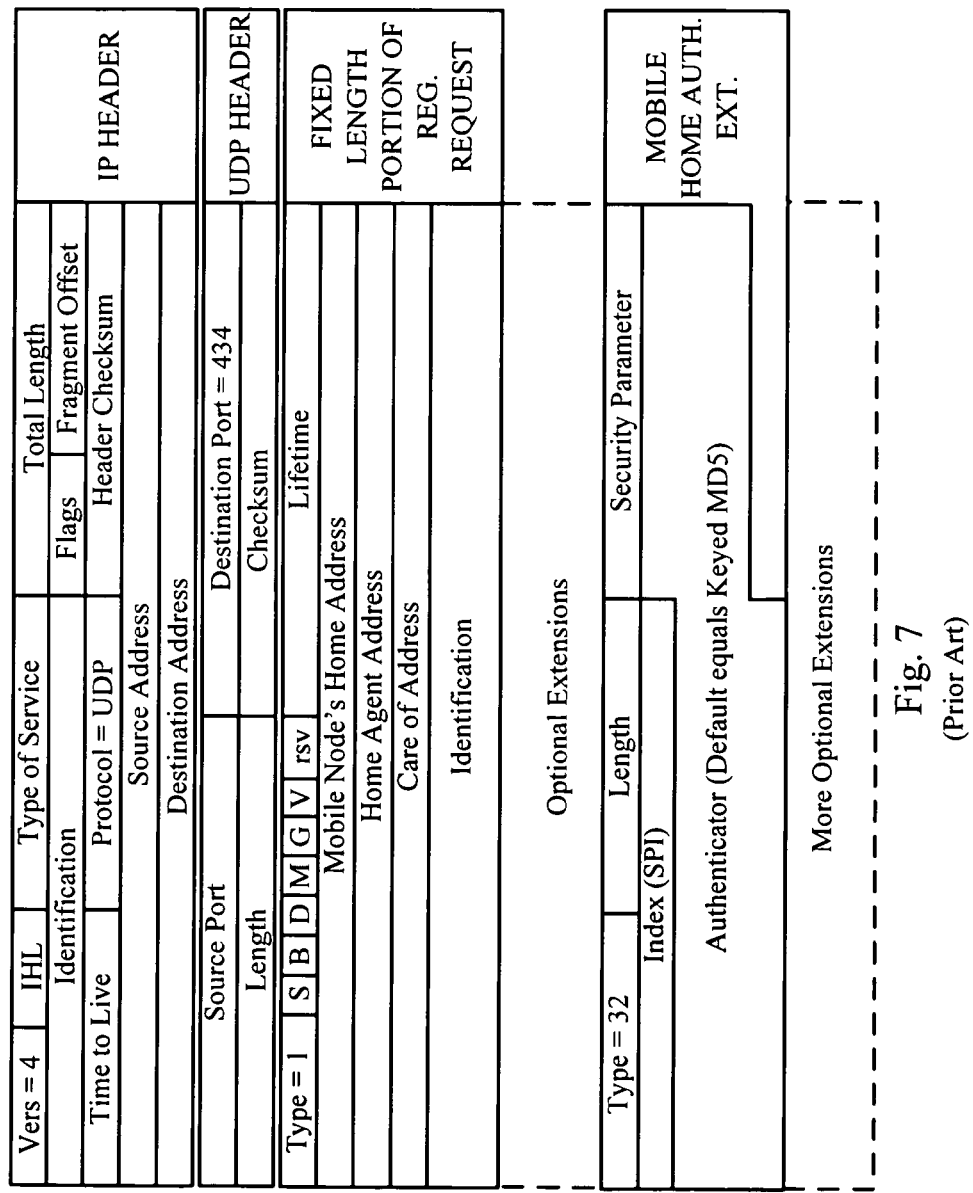
FIG. 7 is a diagram of the format for RRQ Messages as defined by the PoC Consortium.

RRQ messages have room for optional extensions where additional code can be stored. The preferred embodiment places the binary SIP messaging information into this extension area to form the enhanced RRQ message 60. The HA 40 parses this information from the enhanced RRQ message 60 and sends it to the CSCF 22 as the binary SIP Invite message 62. The CSCF 22 extracts the information fields from the CSCF 22 database that were stored during the registration process and reconstructs the binary SIP Invite message 62 into a regular SIP Invite message 56, with the exception of the ID field, before sending it on to the PoC Server 18 to complete the PTT call set-up process. The PoC Server 18 inserts the proper SIP URI for the ID field, as previously discussed with respect to FIG. 4, and sets up the call. FIG. 7 displays the format for RRQ messages as defined by the Internet Engineering Task Force (IETF) RFC 3344. Note the areas in the center and at the bottom where the optional extensions can be placed. The optional extension areas are where binary formatted SIP data is added to create the enhanced RRQ message 60.

The addition of binary SIP code in the enhanced RRQ message 60 shrinks the SIP Invite messaging information sent from the HA 40 to the CSCF 22 in two ways—splitting the contents of a standard SIP Invite message 56 into two parts (data re-used from the registration and data sent in the RRQ content) and utilizing binary SIP messaging information to replace regular SIP messaging information in the RRQ. FIG. 8 is a sample SIP Invite message using regular SIP messaging information. The total size of this message is 1280 bytes.

Table 3 contains the binary SIP equivalents to the fields in the SIP message shown in FIG. 8. By exchanging binary SIP values for the regular SIP fields, the message size can be reduced to 20 bytes instead of 1280 bytes. These binary SIP values sufficiently compact to fit into the enhanced RRQ message 60 in the areas set aside for optional extensions as shown in FIG. 7. The HA 40 parses these extension bytes and sends the binary SIP values to the CSCF 22, which uses these values along with the data stored during the registration process to reconstruct the regular SIP Invite messaging information into a standard SIP Invite message 56.

UE 10 is transmitted from UE 10 to CSCF 22 and stored in the database 64 of CSCF 22. The data sent during the registration process in registration message 32 includes the following fields: accept-contact, require, supported, user agent, to, from, via, route, session-expires, and content-type.

TABLE 3

Binary SIP Equivalents

| Field | Sub-Field | Start Byte | End Byte | Comment |
|---|---|---|---|---|
| Message-Header | MsgID | 0 | 0 | Bits 0-2 - Values defined as follows: 000b = INVITE 001b = 100 Trying 010b = 2XX Final Response 011b = Non 2XX final Response 100b = ACK |
| | ReferCount | 0 | 0 | Bits 3-7 - Represents the number of invited users |
| | reserved | 1 | 1 | Set to 00000000b |
| Request-Uri-ID | | 2 | 2 | Represents an 8-bit value Group ID, in case of Group Call. Not used in case of Ad Hoc Call |
| SUB-ID | | 3 | 6 | IP Address of the subscriber |
| Public-ID | | 7 | 7 | Bits 0-1 |
| Session-ID | | 7 | 7 | Bits 2-3 - Up to 4 sessions are supported |
| Call-Type | | 7 | 7 | Bits 4-5 - Represents the call type. 00b = Ad Hoc Call, 01b = Instant Group Call, 10b = Jumpstart Call |
| Codec-Type | | 7 | 7 | Bits 6-7 - Represents the codec to use. 00b = AMR mode set 0, 01b = AMR mode set 1, 10b = G729 Full Rate, 11b = G729 Half Rate |
| PTime | | 8 | 8 | Bits 0-2 - Represents Ptime to use. 00b = 160, 01b = 200, 10b = 400 |
| Refer-User-IDs | | 9 | 20 | Used according to the Call Type: Variable list of invited users. Number of invited users is specified by ReferCount in the message header. Used to include the invited user's phone number, in case of Jump Start Call |
| Total Bits | | | 163 | |
| Total Bytes | | | 20.375 | |

By utilizing both aspects of the method the overall size of the messages traveling over the PoC system to establish a PTT session are greatly reduced, resulting in reduced call latency and faster set-up times of about 30-35%. This method can be utilized for the portion of the message stream that is sent to the terminating handset in much the same manner as it is shown in the example embodiment coming from the originating handset. Alternatively, regular SIP response messages, such as the 2000K message, can be converted to binary SIP using the method described herein. These response messages make up a significant portion of the messages traveling across the system during call establishment and utilizing this method wherever possible positively impacts call latency and set-up time.

E. Processes

Figure 9:
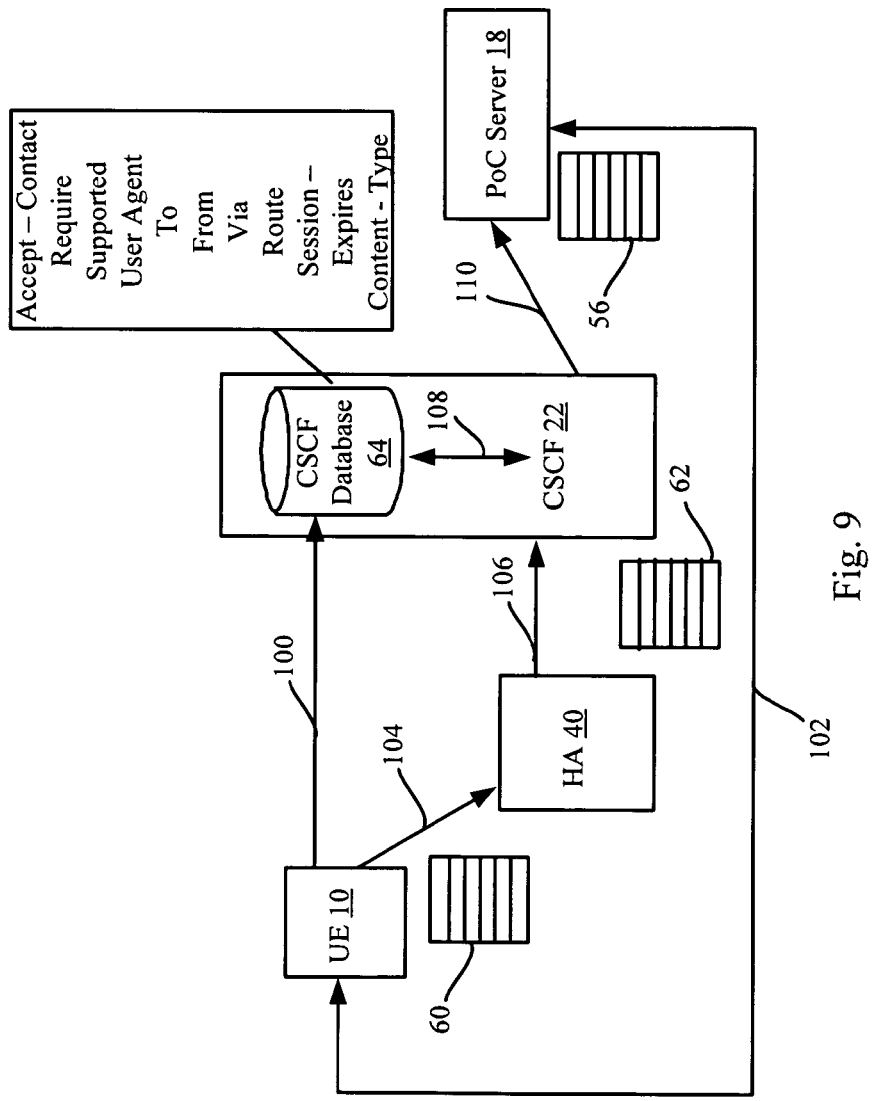
FIG. 9 is a combination block diagram and flow chart illustrating the SIP message process of the preferred embodiment of the invention.

FIG. 9 illustrates the combined processes, as previously described, for reducing the call set-up time and packet latency from the initial registration process to the completion of the call set-up in the PoC system and the actions each element of the PoC system performs on the SIP messaging information before passing it to the next element in the chain. First, the UE 10 registers with the PTT service (step 100). As part of the registration process, data identifying the Once registered, UE 10 requests a contact list 34 from the PoC server 18. In response to the request, UE 10 receives the contact list 34 with the ID index for all listed contact entries (step 102). When UE 10 is ready to make a PTT call, UE 10 initiates the channel establishment process. As part of the channel establishment process, UE 10 generates and sends to HA 40 and enhanced RRQ message 60 (step 104). As a result, the binary SIP Invite messaging information is sent from the UE 10 to the HA 40 in the enhanced RRQ message 60. HA 40 parses the binary SIP Invite messaging information from the enhanced RRQ message 60 and then sends the parsed binary SIP Invite messaging information 62 to the CSCF 22 (step 106). Based upon the binary SIP Invite messaging information and the data identifying UE 10 sent during the registration process, CSCF 22 generates a standard SIP Invite message 56 (step 108). In order to generate the standard SIP Invite message 56, CSCF 22 retrieves the fields from database 64 that are needed for the standard SIP Invite message 56 but not present in the binary SIP Invite messaging information. Additionally, CSCF 22 also transforms the binary SIP Invite messaging information to regular SIP for inclusion in the regular SIP Invite message 56.

Then, the regular SIP Invite message 56 is then transmitted to PoC Server 18 (step 110), which then completes the SIP Invite segment of the PTT call set-up process to establish the PTT call between the caller UE 10 and the recipient UE 10 by matching the ID to the SIP URI of recipient UE 10 based on stored contact list index.

F. Conclusion

Having disclosed exemplary embodiments and the best mode, modifications and variations may be made to the disclosed embodiments while remaining within the subject and spirit of the invention as defined by the following claims.

The invention claimed is:

1. In a cellular network having a push-to-talk (PTT) system, a caller client device for initiating a PTT call to a recipient client device, wherein said caller client device is configured to:
   register said caller client device with a Push-To-Talk over cellular (PoC) server using an enhanced registration request message, wherein said enhanced registration request message is created by adding a binary session initiation protocol (SIP) invite in a registration request message;
   initiate a call set up from said caller client device with a recipient client device, wherein the call set up is embedded with a binary SIP invite message;
   receive a requested contact list from said PoC server, wherein each contact in the contact list is associated with a universal resource identifier (URI) and a corresponding identification number of said recipient client device, and wherein said identification number is smaller in size than said URI; and
   transmit said binary SIP invite message to said PoC server using a router in said cellular network.

2. The caller client device of claim 1, wherein said caller client device is configured to:
   transmit said binary SIP invite message from said caller client device to said router; and
   transmit a parsed binary SIP invite messaging from said router to a call session control function at a server, wherein the parsing of said binary SIP invite is performed at said router.

3. The caller client device of claim 1, wherein said binary SIP invite message for initiating said PTT call between said caller client device and said recipient client device comprises SIP messaging information encoded in a binary format.

4. The caller client device of claim 1, wherein said caller client device is configured to:
   request said contact list from said PoC server after said caller client device is registered with said PoC server; and
   store the received contact list.

5. A method of communication in a cellular network, said method comprising:
   creating an enhanced registration request message by adding a binary session initiation protocol (SIP) invite in a registration request message;
   registering a caller client device with a Push-To-Talk (PTT) over cellular (PoC) server using said enhanced registration request message;
   initiating a call set up from said caller client device with a recipient client device, wherein the call set up is embedded with a binary SIP invite message;
   receiving a requested contact list from said PoC server, wherein each contact in the contact list is associated with a universal resource identifier (URI) and a corresponding identification number of said recipient client device, and wherein said identification number is smaller in size than said URI; and
   transmitting said binary SIP invite message to said PoC server using a router in said cellular network.

6. The method of claim 5, further comprising:
   transmitting said binary SIP invite message from said caller client device to said router; and
   transmitting a parsed binary SIP invite messaging from said router to a call session control function at a server, wherein the parsing of said binary SIP invite is performed at said router.

7. The method of claim 5, wherein said binary SIP invite message comprises SIP messaging information encoded in a binary format.

8. The method of claim 5, further comprising:
   requesting said contact list from said PoC server after said caller client device is registered with said PoC server; and
   storing the received contact list.

* * * * *